United States Patent [19]

Isaka

[11] 4,327,811
[45] May 4, 1982

[54] MOTORCYCLE EXHAUST SYSTEMS

[75] Inventor: Yoshiharu Isaka, Shizuoka, Japan

[73] Assignee: Yamaha Hatsudoki Kabushiki Kaisha, Iwata, Japan

[21] Appl. No.: 110,468

[22] Filed: Jan. 8, 1980

[30] Foreign Application Priority Data

Jan. 18, 1979 [JP] Japan .................................. 54-5441

[51] Int. Cl.³ .......................... B62M 7/06; F01N 7/08
[52] U.S. Cl. ...................................... 180/219; 60/313; 123/55 VF; 180/225; 180/227; 180/296; 181/238
[58] Field of Search ............... 180/219, 225, 227, 229, 180/296; 280/284; 60/312, 313; 123/55 VF, 56 AA, 56 BA; 181/211, 238, 239, 240

[56] References Cited

U.S. PATENT DOCUMENTS

| 2,940,249 | 6/1960 | Gospodar | 60/313 |
| 3,453,824 | 7/1969 | Biesecker | 180/225 |
| 3,937,484 | 2/1976 | Morioka et al. | 180/219 |
| 3,949,829 | 4/1976 | Honda et al. | 180/225 |
| 4,204,585 | 5/1980 | Tsuboi et al. | 180/219 |
| 4,226,296 | 10/1980 | Higaki | 180/219 |
| 4,230,074 | 10/1980 | Ichikawa et al. | 123/55 VF |

Primary Examiner—Robert R. Song
Assistant Examiner—Donn McGiehan
Attorney, Agent, or Firm—Donald D. Mon

[57] ABSTRACT

A motorcycle has an engine with two banks of cylinders. One bank is forward of the other, and its exhaust pipe or pipes passes forwardly, downwardly, and outwardly of the frame, and then rearwardly beneath the side of the engine to reach a muffler and tailpipe. The frame includes a pivoted fork-like rear section with a power transmission. The rear exhaust pipe or pipes extends rearwardly and downwardly between the arms of the rear section, and makes connection with the muffler. In another embodiment for engines with multiple cylinders in each bank, the rear exhaust pipes cross over one another, and extend downwardly outside of the arms. They may also be elongated inside the muffler so the lengths of the forward and rear exhaust pipes are equal. They can connect with one another so as to share outlets into the muffler.

7 Claims, 8 Drawing Figures

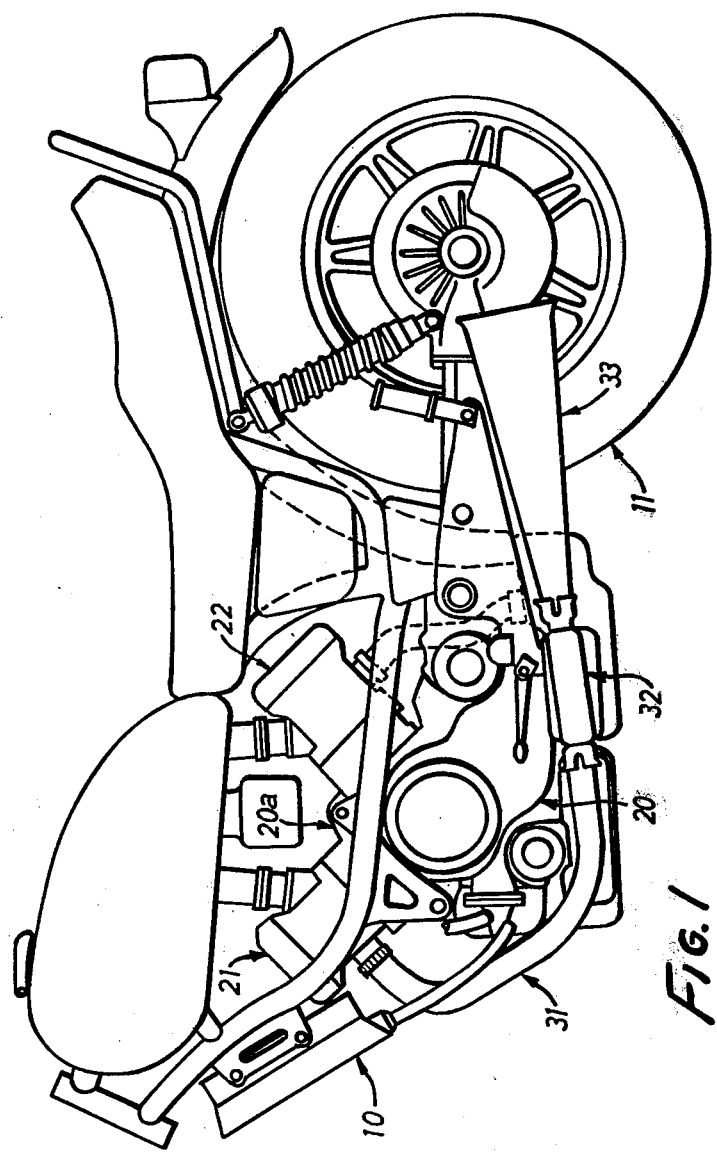

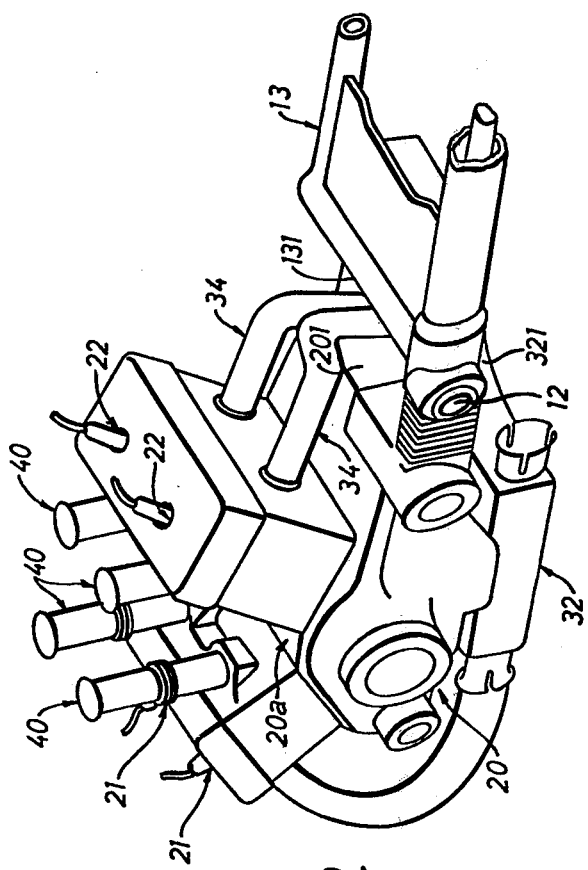
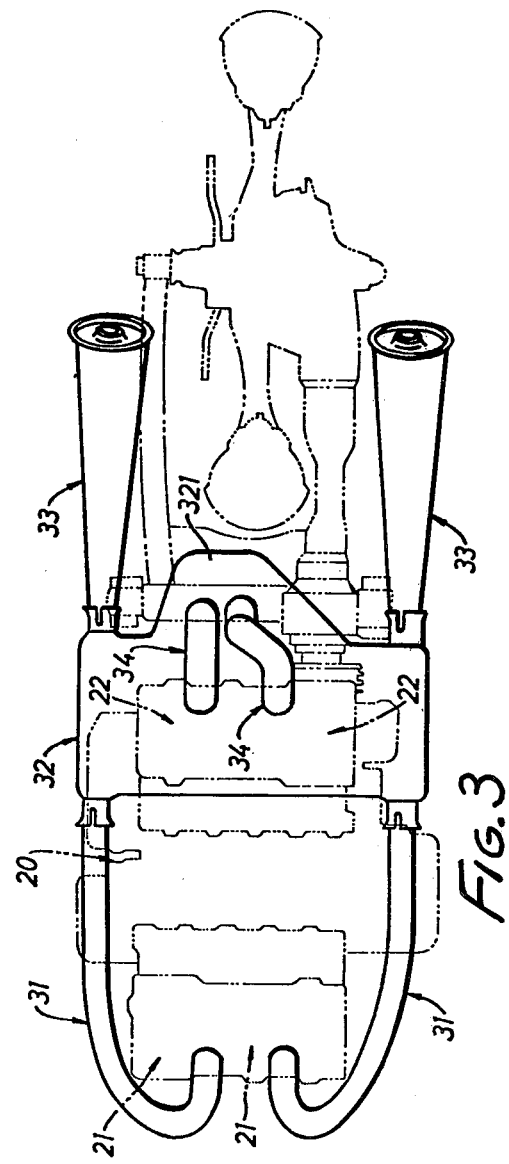

MOTORCYCLE EXHAUST SYSTEMS

FIELD OF THE INVENTION

This invention relates to motorcycle exhaust systems.

BACKGROUND OF THE INVENTION

Motorcycle engines with two banks are generally mounted to the motorcycle frame with their crankshaft axis arranged laterally of the forward direction, and with one bank of cylinders located forwardly of the other. In such installations, it is a simple matter to locate the exhaust pipe or pipes from the forward bank so it is not readily contacted by the rider. However, placing of the exhaust pipe or pipes from the rear bank presents difficult problems. Because of the engine construction, if the rear bank pipes are directly connected with the front bank pipes at the side of the engine, there is risk of contact by the leg of the rider. If they extend directly rearward, the risk exists that their heat may deteriorate the rear tire.

Furthermore, in V-type engines with four cylinders, there is an advantage if all of the pipes can be the same length.

It is an object of this invention to locate the rear exhaust pipes in a location not threatening to the rider or to the rear tire.

It is another object of this invention to enable the four exhaust pipes to be made the same length.

This invention is carried out with a motorcycle frame which includes a forward section which carries an engine and a front wheel, and a fork-like rear section which is pivoted to the forward section and carries the rear wheel, and a transmission from the engine to the rear wheel. The engine has two banks, the cylinder or cylinders of the front bank being forwardly of the cylinder or cylinders of the rear bank. The forward exhaust pipe or pipes extends forwardly, downwardly and outwardly, and then rearwardly beneath the side of the engine. In one embodiment of the invention, the rear exhaust pipe or pipes extends rearwardly and downwardly between the engine and the pivot axis of the arms of the rear section between the planes of the arms. All pipes communicate with a muffler, and the muffler exhausts to atmosphere.

In another embodiment of the invention, in which a V-type four cylinder engine is used, the rear pipes cross one another, and descend outside of the planes of the arms and forward of the pivot axis of the arms to enter the muffler, and extend in the muffler for such a length that the lengths of all pipes are equal.

The above and other features of this invention will be fully understood from the following detailed drawings, in which:

FIG. 1 is a side elevation showing the major portions of a motorcycle provided with one embodiment of this invention;

FIG. 2 is a perspective view of a portion of FIG. 1;

FIG. 3 is an enlarged plan view showing portions of FIG. 1;

DETAILED DESCRIPTION OF THE DRAWINGS

Figure 4:
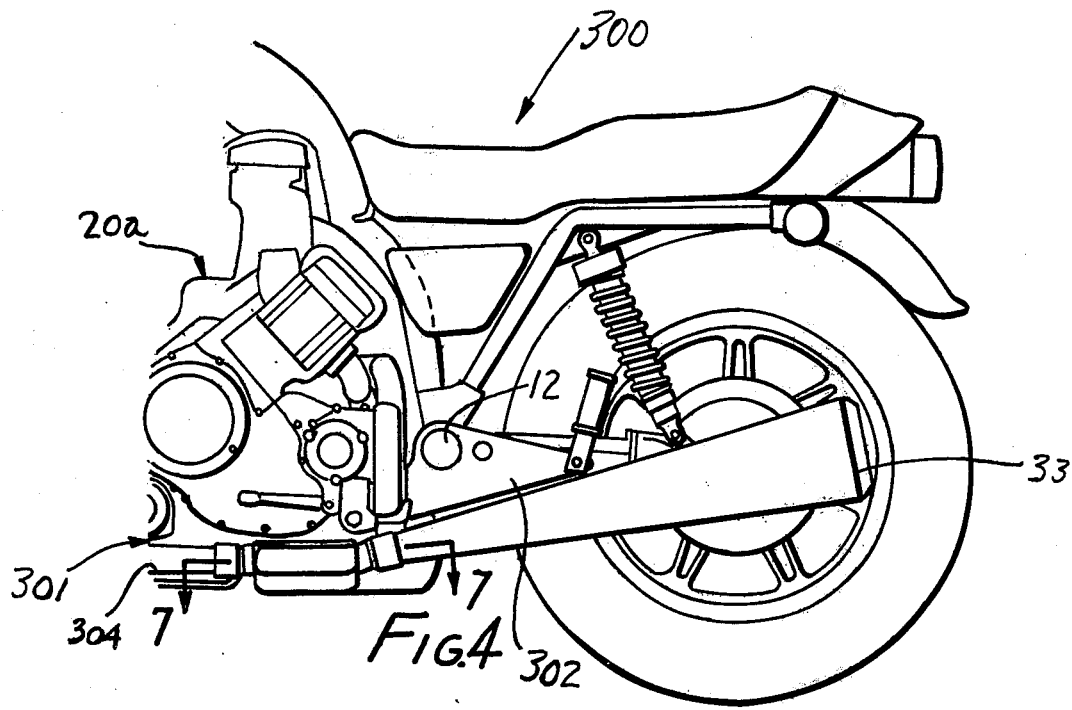
FIG. 4 is a fragmentary side elevation view of a motorcycle with another embodiment of the invention.

FIG. 1 shows a portion of a motorcycle using the exhaust system according to the present invention. In this motorcycle, a power unit 20 equipped with a four cylinder V-type engine 20a is mounted on a body 10. The output of the power unit 20 is transmitted through a drive shaft to a rear wheel 11. The V-type four cylinder engine 20a forming a part of the power unit 20 is composed, as is apparent especially from FIG. 2, of two front cylinders 21 and 21 and two rear cylinders 22 and 22.

Each of the front cylinders 21 and 21 has its exhaust port connected to one end of each of paired first right and left exhaust pipes 31 and 31, as is apparent especially from FIG. 3. Those first exhaust pipes 31 and 31 are constructed to extend from the front of the body 10 downwardly and then rearwardly below the side of the same until their other (rear) ends are both connected at respective sides of the front portion of a muffler 32 which is disposed below the power unit 20. The muffler forms a noise-silencing chamber.

On the other hand, the sides of the rear portion of the muffler 32 are connected to respective one ends of one pair of second right and left exhaust pipes 33 and 33 which thus form a part of the exhaust pipes of the front cylinders 21 and 21. Said second exhaust pipes 33 and 33 are constructed to extend along the lower sides of the body 10 at the sides of the rear wheel 11, and their other ends are opened backward of the body 10. Second exhaust pipes 33 and 33 are sometimes referred to as "tail pipes".

The exhaust ports of the rear cylinders 22 and 22 are connected, as shown in FIGS. 2 and 3, to the respective one ends of one pair of third right and left exhaust pipes 34 and 34. These third exhaust pipes 34 and 34 are constructed to extend downward through the space which is formed between the rear portion 201 of the power unit 20 and a pair of rear wheel supporting arms 13 connected pivotally to the body 10 through a pivot pin 12. The rear wheel is journaled to these arms, and the arms thereby form a rear frame portion. On the other hand, the rear portion 321 of the muffler 32 extends below that particular space so that the other ends of the third exhaust pipes 34 and 34 are connected to the upper side of the rear portion 321. Thus, the third exhaust pipes 34 and 34 are connected in a communicating manner to the exhaust pipe assembly of the front cylinders 21 and 21, which are composed of the first exhaust pipes 31 and 31 and the second exhaust pipes 33 and 33.

Incidentally, reference numerals 40 and 40 appearing in FIGS. 1 and 2 indicate intake branches connecting the respective cylinders 21, 21, 22 and 22 of the engine 20a to a not-shown carburetor.

In the motorcycle thus constructed, since the exhaust pipes (i.e., the third exhaust pipes 34 and 34) of the rear cylinders 22 and 22 of the engine 20a are constructed to extend downwardly through the space, which is formed between the rear portion 201 of the power unit 20 and the base 131 of the rear arms 13, and are connected through the muffler 32 to the exhaust pipes (i.e., the first exhaust pipes 31 and 31 and the second exhaust pipes 33 and 33) of the front cylinders 21 and 21, the third exhaust pipes 34 and 34 can be prevented from being exposed to the sides of the body 10. As a result, there is neither a danger that the legs of the motorcycle driver may contact with the third exhaust pipes 34 and 34 nor a fear that the tire of the rear wheel 11 may be burnt.

Although the foregoing embodiment is directed to the construction, in which the exhaust pipes of the front cylinders 21 and 21, i.e., the first exhaust pipes 31 and 31 and the second exhaust pipes 33 and 33 are connected through the muffler 32, and in which the exhaust pipes (i.e., the third exhaust pipes 34 and 34) of the rear cylinders 22 and 22 are connected through the muffler 32 to those exhaust pipes of the front cylinders 21 and 21, the present invention can be modified to a construction, in which each of the exhaust pipes of the front cylinders 21 and 21 is composed of a single pipe and in which the exhaust pipes of the rear cylinders 22 and 22 are guided downward through the space between the rear portion 201 of the power unit 20 and the base 131 of the rear arms 13 and are then bent sideway so that they are connected directly to the inner sides of the exhaust pipes of the front cylinders 21 and 21. Moreover, the present invention can be applied to a variety of motorcycles of the type, in which the power unit is equipped with an engine having at least two cylinders arranged in a longitudinal direction of the motorcycle body.

As has been described hereinbefore, this embodiment of the present invention has its constructional characteristics in that the exhaust pipe having its one end connected to the rear cylinder of said engine is arranged to extend downward through the space, which is formed between the rear portion of said power unit and the base of the rear wheel supporting arms, and to have its other end connected to the exhaust pipe which in turn has its one and connected to the front cylinder of said engine and which is disposed below the side of said body. As a result, the arrangement of the exhaust pipe of the aforementioned rear cylinder can be made such that there is neither danger that the exhaust pipe may contact with the leg of the driver nor a fear that the rear wheel tire may be burnt.

Figure 5:
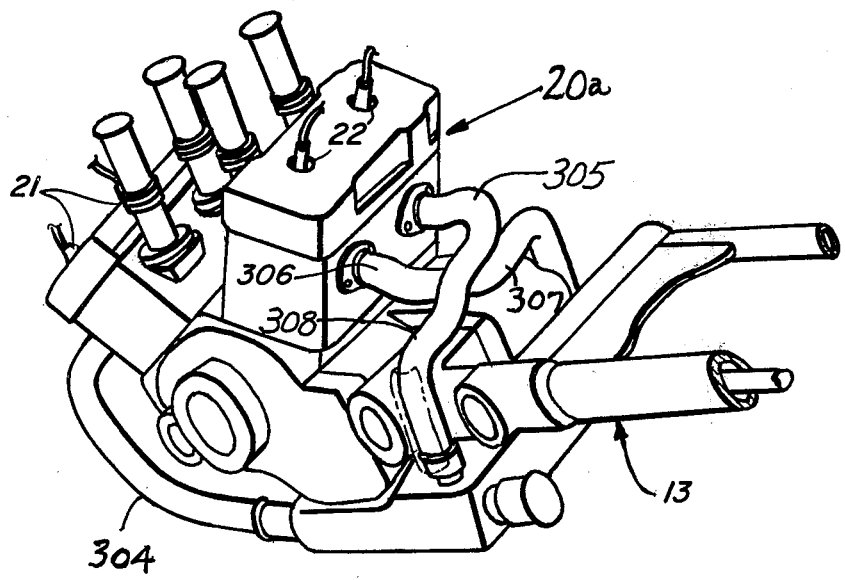
FIG. 5 is a perspective view of a portion of FIG. 4.
Figure 6:
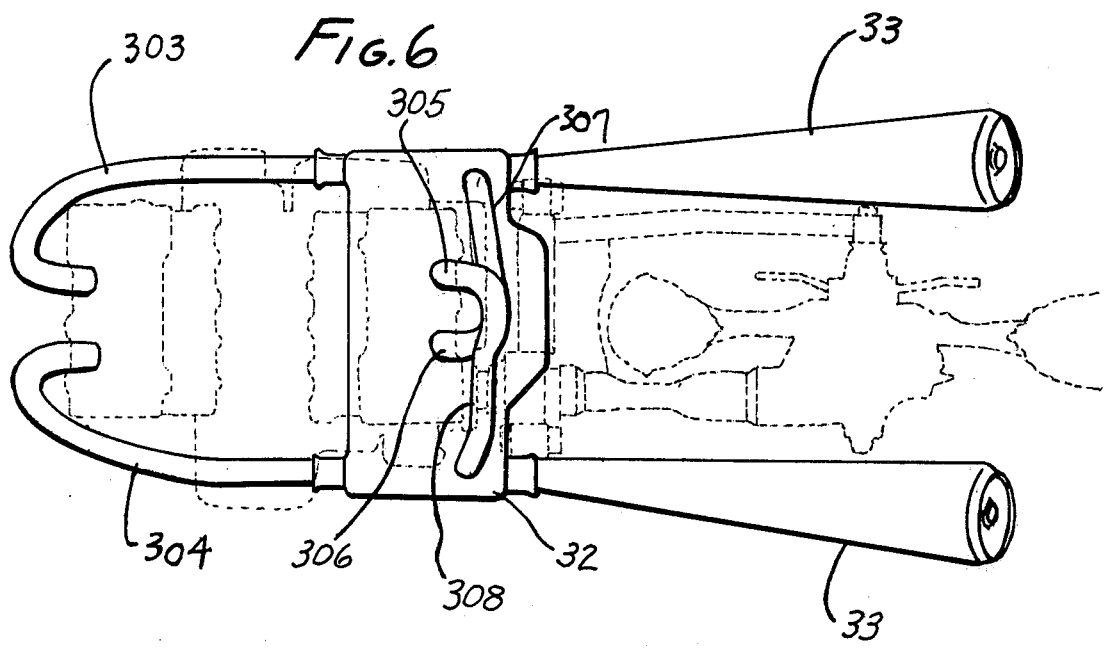
FIG. 6 is an enlarged plan view showing portions of FIG. 4.

FIGS. 4, 5 and 6 show a motorcycle 300 with a forward frame portion 301 for supporting a front wheel (not shown), and a rear frame portion 302 as in FIGS. 1-3. A four cylinder V-type engine 20a is shown, together with exhaust tailpipes 33, 33, front bank exhaust pipes 303, 304 and rear bank exhaust pipes 305, 306 from front bank cylinders 21 and rear bank cylinders 22.

The rear frame portion is joined to the front frame portion by pivot 12, as in FIG. 3. In fact, except for the configurations of the exhaust pipes 303, 304, 305 and 306, the motorcycles are indentical.

In this embodiment, an objective is to make all of the exhaust pipes 303-306 of equal length. Obviously the arrangement of FIGS. 1-3 cannot provide this advantage.

Figure 7:
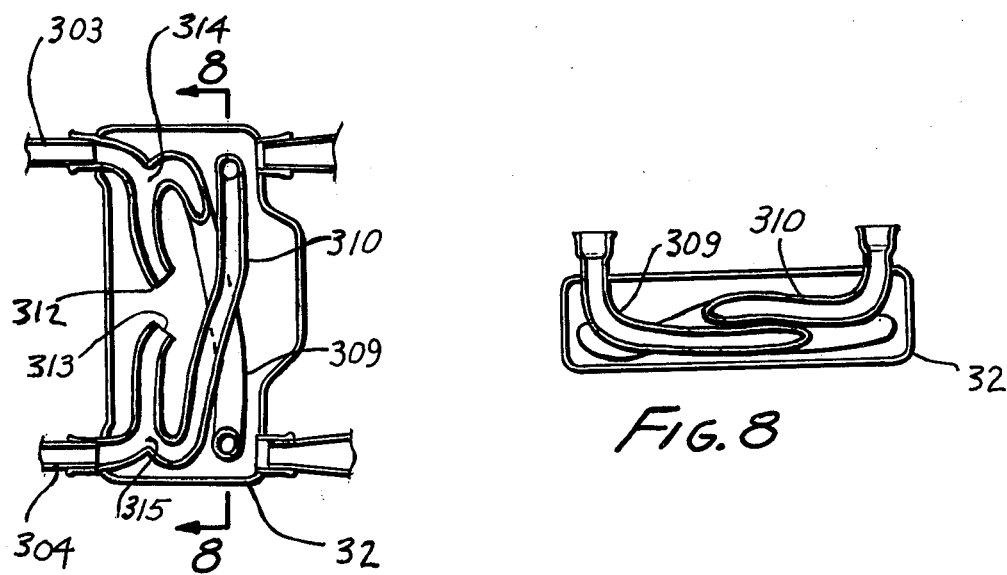
FIG. 7 is a fragmentary cross-section taken at line 7—7 in FIG. 4.
Figure 8:
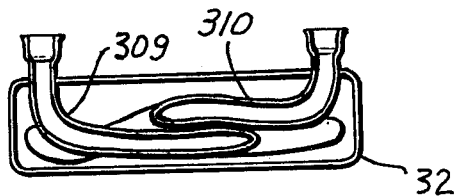
FIG. 8 is a cross-section taken at line 8—8 in FIG. 7.

As best seen in FIG. 5 and 6, pipes 305 and 306 extend rearwardly, then have sidewise portions 307, 308 that cross over one another, past and over arms 13, and downward into the muffler. Then, as best shown in FIGS. 7 and 8, they have portions 309, 310 inside the muffler, which join to the front pipes at intersections 314, 315 inside the muffler, and they discharge into the muffler through common openings 312, 313. The lengths to the intersections 314, 315 are all equal.

This invention is not to be limited by the embodiments shown in the drawings and described in the description, which are given by way of example and not of limitation, but only in accordance with the scope of the appended claims.

I claim:

1. In combination with a motorcycle of the type having a front frame portion mounting a front wheel and an engine, and a rear frame portion mounting a rear wheel, said portions being pivotally connected by a horizontally disposed pivot, said rear frame portion comprising a pair of laterally spaced-apart arms, said engine comprising two banks of cylinders, one disposed forwardly of the other, an exhaust system comprising:
    a front bank exhaust pipe extending from said front bank, downwardly and to the side of the said frame and rearwardly;
    a rear bank exhaust pipe extending rearwardly and downwardly between the planes of said arms and between the rear portion of said engine and the pivot of said arms;
    a muffler having a substantial lateral extent mounted to said frame at an elevation beneath that of said engine, all of said exhaust pipes discharging into said muffler; and
    a tailpipe discharging rearwardly from said muffler.

2. A combination according to claim 1 in wich there is a pair of each of said front and rear pipes, disposed one pipe of each pair at each side of the centerline of the motorcycle.

3. A combination according to claim 2 in which there is one of said tailpipes at each side of said rear wheel.

4. In combination with a motorcycle of the type having a front frame portion mounting a front wheel and an engine, and a rear frame portion mounting a rear wheel, said portions being pivotally connected by a horizontally disposed pivot, said rear frame portion comprising a pair of laterally spaced-apart arms, said engine comprising two banks of cylinders, one disposed forwardly of the other, an exhaust system comprising:
    a pair of front bank exhaust pipes extending from said front bank, downwardly and to respective sides of said frame and rearwardly;
    a pair of rear bank exhaust pipes extending rearwardly, crossing each other laterally, and then extending downwardly outside of the planes of said arms and forward of the pivot and rearwardly of the rear portion of said engine;
    a muffler having a substantial lateral extent mounted to said frame at an elevation beneath that of said engine all of said exhaust pipes discharging into said muffler; and
    a tailpipe discharging rearwardly from said muffler.

5. A combination according to claim 4 in which there is one of said tailpipes at each side of the said rear wheel.

6. A combination according to claim 4 in which all of said exhaust pipes extend in said muffler to such an extent that all of their lengths are substantially equal.

7. A combination according to claim 6 in which said front and said rear exhaust pipes join in pairs, and each pair discharges through a single opening into said muffler.

* * * * *